Sheet 1-2 Sheets.
E. Webber,
Sawing Shingles,
No. 735, Reissued June 7, 1859.
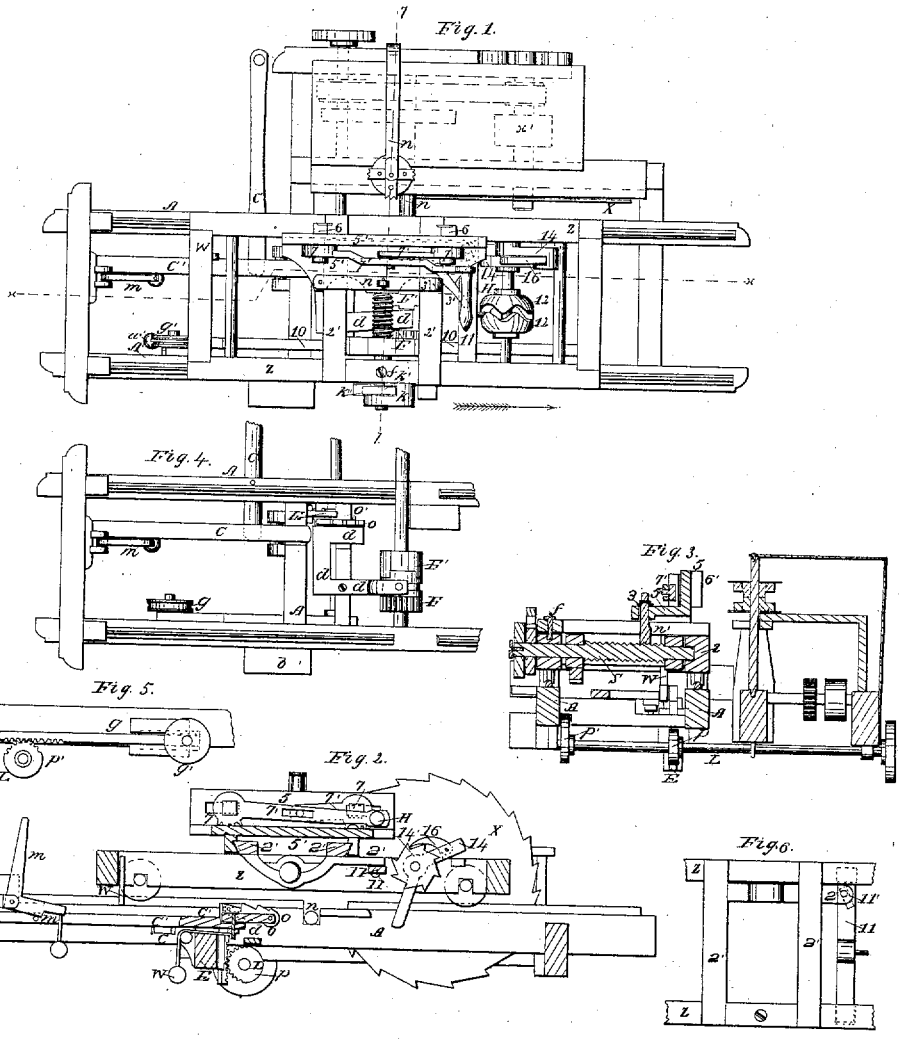
AM. PHOTO-LITHO. CO. N.Y. (OSBORNE'S PROCESS)

Sheet 2-2 Sheets.

E. Webber,

Sawing Shingles,

No. 735, Reissued June 7, 1859.

AM. PHOTO-LITHO. CO. N.Y. (OSBORNE'S PROCESS)

UNITED STATES PATENT OFFICE.

ELBRIDGE WEBBER, OF GARDINER, MAINE.

IMPROVED SHINGLE-MACHINE.

Specification forming part of Letters Patent No. 17,906, dated July 28, 1857; Additional Improvement June 15, 1858; Reissue No. 735, dated June 7, 1859.

*To all whom it may concern:*

Be it known that I, ELBRIDGE WEBBER, of Gardiner, in the county of Kennebec and State of Maine, have invented a new and useful Improvement in Shingle-Machines; and I do hereby declare that the following is a full, clear, and exact description of the same, reference being had to the annexed drawings, forming part of this specification, in which—

Figure 1:
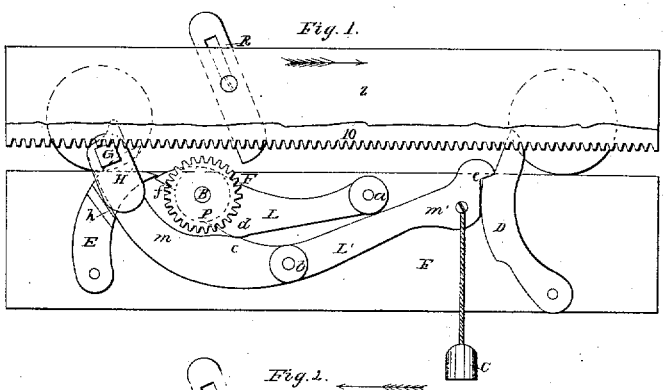
Figure 2:
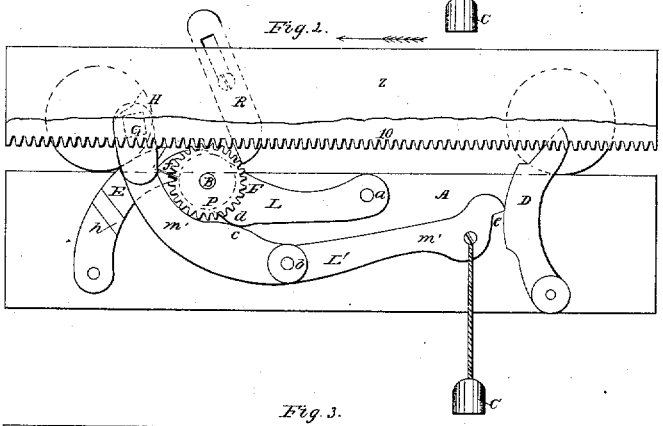
Figure 3:
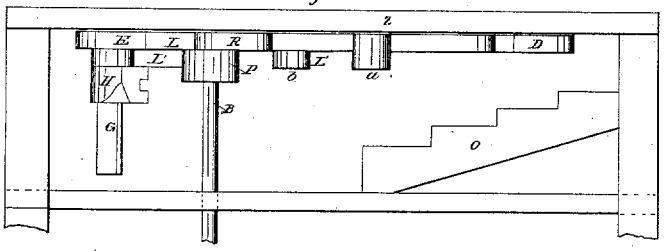

Figure 1 is a top view of the machine. Fig. 2 is a vertical section on line *x x*. Fig. 3 is a vertical section on line *y y*. Fig. 4 is a plan view of the left hand portion of main frame with carriage removed. Fig. 5 shows the mode giving pulley *g′* a motion of translation. Fig. 6 is a top view of vibrating frame, by which the taper of the shingle is regulated. Fig. 1′ is an elevation showing carriage and mechanism by which moving pinion is thrown in and out of gear, the pinion being out of gear. Fig. 2′ is a similar view, showing pinion in gear. Fig. 3′ is a top view of the same parts.

Similar letters of reference denote the same part.

The character of the machine constituting the subject of my invention is that in which the shingles are formed by sawing.

The nature of the invention consists in certain devices, hereinafter to be set forth, for automatically regulating the movement of the carriage and for so presenting the bolt to the saw as alternately to cut the points of the shingles from opposite ends thereof, the details of construction and operation being as follows:

In Figs. 1, 2, 3, 4, 5, and 6 of the drawings, A is the main frame, and Z the carriage, the latter made to traverse in direction of arrow by the meshing of pinion F with rack 10. This pinion F has a loose connection with shaft *n*, and becomes attached thereto when clutch F′ has the position shown in Fig. 4. The lever *d* moves the said pinion so as to mesh with or separate from the clutch. The said lever *d* is attached to a draw-rod, C′, to which is hung a weight, *w*, whose tendency is to produce the closing of the clutch F′, and the consequent movement of pinion F with shaft *n*. This rod is also connected with a lever, C, for operating lever *d* by hand.

Upon the side of a branch of lever *d* is a ratchet, *o*, attached to lever *d* by a pin, *o′*, so that pressure against any of the teeth of this ratchet in direction of arrow will separate the clutch F′ and pinion F, and leave the carriage Z free to be drawn back by the action of the weight *w′*, attached to a cord passing over sheave *g′*. The depending stud W of the carriage is designed to effect this operation, and the extent of the movement of the carriage in direction of arrow will be governed by the number of teeth of ratchet *o* which the said stud can pass over before contact. To govern this amplitude of movement there is a shaft, L, passing across the machine, Fig. 3, on which is a pinion, *p*, meshing with a rack, E, Fig. 2. A slot in this rack passes over a pin in the free extremity of ratchet *o*, so that the elevation or depression thereof is readily effected by turning shaft L. This regulation of the forward movement of carriage Z renders another adjustment necessary—that is, the preservation of a constant descent of weight *w′* under all circumstances. This is effected by attaching the journal of sheave *g′* to a rack-slide, *g*, Fig. 5, which rack meshes with a pinion, *p′*, on shaft L, Fig. 3, thereby causing the sheave *g′* to be adjusted to the run of the carriage Z. There is a bent lever, *m*, at the foot of the frame, notched and weighted, as shown at Fig. 2. This notch catches pin *m′* on slide-rod C′ when by the opening of clutch F′ this rod is drawn forward, thus permitting weight *w′* to draw the carriage back. The striking of the carriage-frame against the upright branch of this lever at the termination of this backward movement releases pin *m′* and permits weight *w* to act, and, operating lever *d*, closes clutch F′, and permits the carriage to again move forward. The head-block 5′ moves across the carriage Z on the frame 2′, and is fed up by means of screw S and depending nut *n′* by means of lever K, pawl *k′*, and ratchet *k″*, and projecting bench *b′*. This nut is raised from the screw by means of spring 3 and hand-lever 3′, to allow said head-block to slide back upon frame 2′. This frame 2′ is attached to the carriage-frame by bolt *f*, about which it is free to vibrate. This movement is produced in the following manner: A pin, 11′, depending from a portion of frame 2′, enters an oblique slot in slide-piece 11, as seen in Fig. 6. This slide-piece has a pin embraced between the irregular wheels 12, which, from the rotation of said wheels, produces a reciprocating motion of the slide-piece 11. When this movement of piece 11 takes place, the slot-and-pin connection with frame 2′ will cause a vibration of said frame about bolt *f*. This causes the bolt to be so presented to the saw that the butts and points of the shingles shall alternate. The rotation of irregular wheels 12 is produced by ratchet 14′, lever 14, pawl 16, and bench *b*″. The wheels 12 are adjustable upon their shaft, so as by their greater or less opening to regulate the amplitude of reciprocation of bar 11, and the consequent vibration of head-block. This is necessary in order that the machine may be adapted to the production of shingles of different lengths. The bolt is held between dogs 6 6, attached to two pinions, 7 7, at the extremities of lever 7′ 7′. One of these levers is slotted and the other has a pin entering in the slot, so that both are moved by power applied to lever-handle H. The pinions mesh in racks in the floor of the head-blocks, and thus move the dogs 6 as desired, and firmly hold the bolt when inserted between the teeth of the dogs. The saw X is driven by power applied to pulley X′, while motion is communicated to shaft *n*, as shown in Fig. 1. As the carriage Z is drawn back by weight *w*′, levers *k* and 14 press against their respective benches *b*′ *b*″, and, moving the ratchets *k*″ and 14′, feed the head-block forward, and give the necessary vibration to the frame 2′, and through it to the head-block. The striking of the carriage against lever *m* closes the clutch F′, as above described, and produces the forward movement of the carriage a sufficient distance for the length of bolt, the amplitude of which is regulated as before described. The operation is thus continued automatically until the bolt is consumed, the butts and points of successive shingles being cut from opposite extremities of the bolt.

The following relates to the additional improvement to my patent granted June 15, 1858, reference being had to Figs. 1′ 2′, and 3′, in the drawings, in which A is the main frame, and Z is the carriage, made to traverse in direction of red arrow by the meshings of pinion F with rack 10, the shaft B of this pinion being driven by pulley P thereon. This shaft has its bearing in the end of a lever, L, attached to the main frame at *a*, and it is by the automatic movings of this lever that the connection of rack and pinion is produced. Under lever L is a lever, L′, attached to main frame at *b*, and capable of movement about this attachment. The upper edge of this lever has a projection, *c*, under a corresponding projection of lever L, (marked *d*.) To the right-hand extremity of this lever L′ is hung a weight, C, whose tendency is to depress the arm to which it is attached, and by means of projections *c* and *d* lift lever L and bring pinion F and rack 10 into gear. The weighted arm of lever L′ has a notch, *e*, by which it rests on detent D when this arm is elevated, as shown in Fig. 1′. The extremity of lever L has a notch, *f*, which, when the lever is lifted, rests upon the notch of detent E. This detent passes behind lever L′, and has a projection, *h*, upon its face, which causes the detent E to be removed from under lever L when arm *m* of lever L′ is depressed, the position of this projection *h* being so arranged that it will not be acted upon by lever L′ until after the weighted arm of said lever is sufficiently high to receive its detent D. In the extremity of this arm *m* is a horizontal bar, G, on which slides a trip-piece, H, capable of being moved by the operator so as to come in contact with one of the notches of stop *o*. The contact of the trip H with this stop causes arm *m* of lever L′ to be depressed, with the effect of withdrawing detent E from under lever L. This portion of the mechanism is so constructed that as the lever L′ is acted upon by the contact of the trip pieces H and *o* to elevate arm *m*′, this function is performed while the pinion remains in gear with the rack, so that the detent D shall receive the said arm before the detent E is forced from under lever L, and permits pinion F to drop. When the pinion F drops out of the rack, the carriage runs back by the action of a weight, as described in my original patent, in direction of black arrow, until trip R, attached to the carriage, encounters the head of the detent D, throwing it from under lever L′. Weight C then acts, depressing arm *m*′. This causes lever L to be lifted, and pinion F to gear with rack 10, detent E dropping in to hold the lever firmly in place. The carriage then runs forward in direction of red arrow until the required notch of the stop *o*, attached to the carriage, strikes the trip-piece H, lifts arm *m*′ of lever L′ until it rests on detent D, and then effects the dropping of pinion F, as above set forth.

What I claim, and desire to secure by Letters Patent, is—

1. The combination of the vibrating frame 2′ with the obliquely-slotted slide-piece 11 and the cam-wheel 12, arranged and operating substantially as and for the purpose set forth.

2. The relative adjustment of ratchet *o* and sheave *g*′, substantially as and for the purpose specified.

3. The arrangement of the pinions 7 7 with levers 7′ 7′ and dog 6 6, as herein set forth.

4. Raising and securing the weighted arm of lever L′ prior to the disengagement of the traversing mechanism, substantially as hereinbefore set forth.

In testimony whereof I have hereunto signed my name before two subscribing witnesses.

E. WEBBER.

Witnesses:
GEO. W. WAITT,
JOSIAH MAXCY.